Jan. 13, 1925.
A. M. LIODAL
1,523,224
HARVESTER REEL
Filed March 27, 1923  2 Sheets-Sheet 1
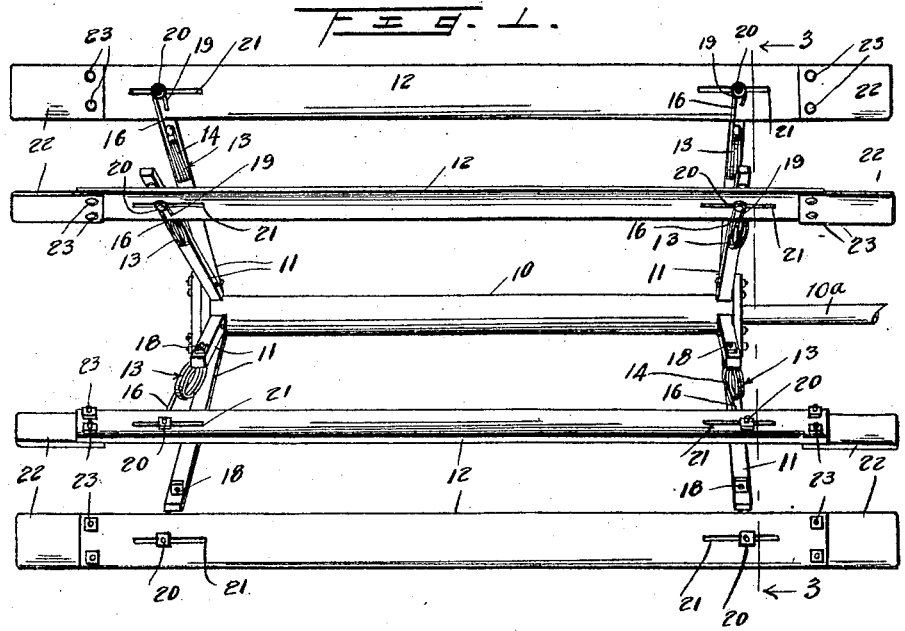
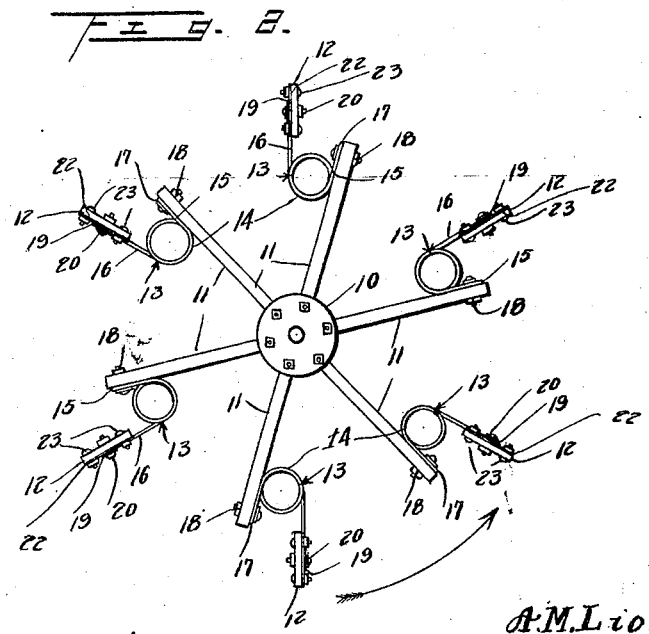
Inventor
A. M. Liodal.
By
Attorney

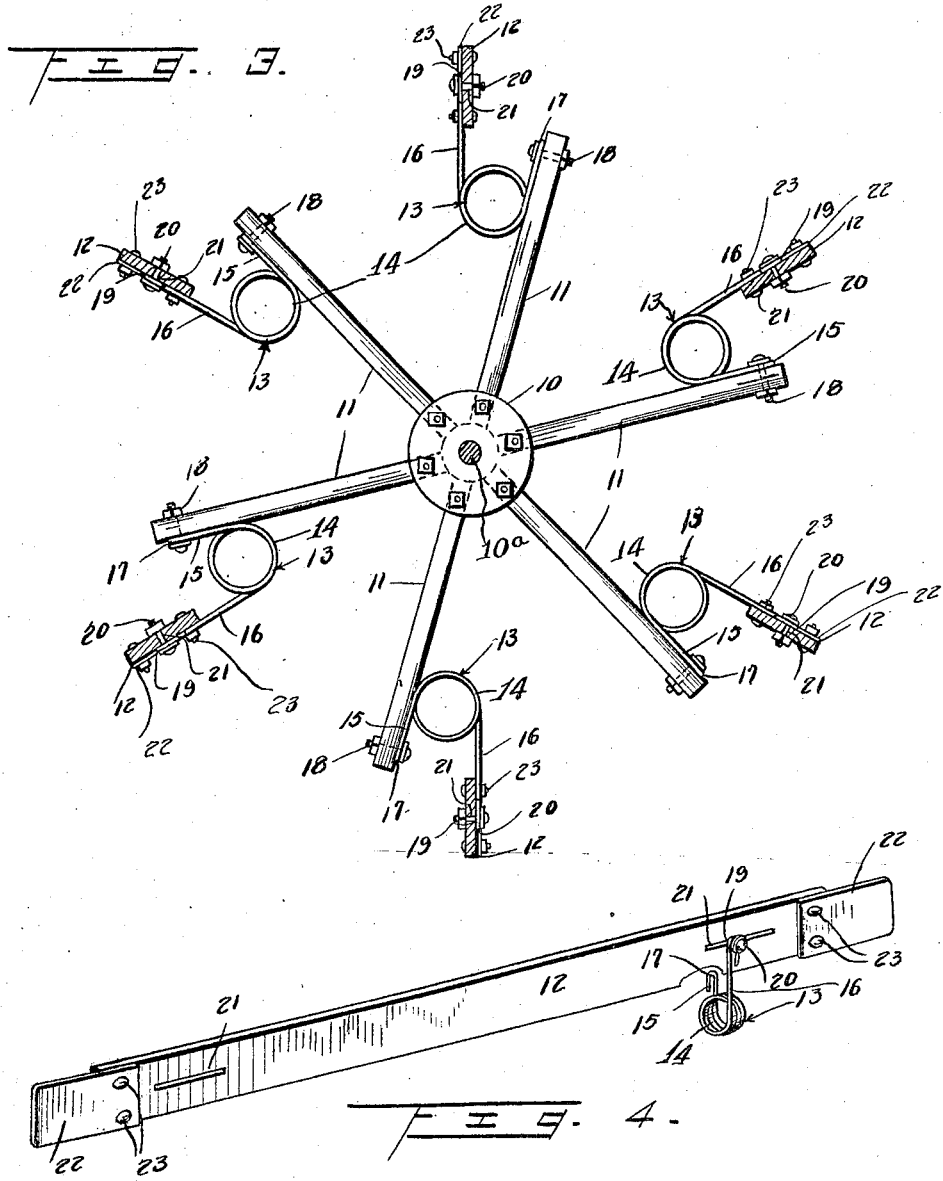

Patented Jan. 13, 1925.

1,523,224

UNITED STATES PATENT OFFICE.

ANTON M. LIODAL, OF MICHIGAN, NORTH DAKOTA.

HARVESTER REEL.

Application filed March 27, 1923. Serial No. 628,045.

*To all whom it may concern:*

Be it known that I, ANTON M. LIODAL, a citizen of the United States, residing at Michigan, in the county of Nelson and State of North Dakota, have invented certain new and useful Improvements in Harvester Reels; and I do hereby declare the following to be a full, clear, and exact description of the invention, such as will enable others skilled in the art to which it appertains to make and use the same.

This invention relates to a reel such as is used in binders and other harvesters.

It is aimed to provide a novel, improved and inexpensive construction in which the danger of breakage of the cross slats is materially minimized or reduced.

A second object is to provide a construction in which the cross slats are resiliently fastened in place.

Still another object is to provide a construction in which coil springs are utilized to connect the cross slats to the reel and which have arms of unequal length to facilitate their connection.

A further object is to provide a construction in which the slats are provided with resilient or spring leaves at the ends thereof to minimize or reduce the chances of breakage at said ends.

With the above and additional objects, such as will hereinafter appear, the invention has been embodied in one form as illustrated in accompanying drawings.

In said drawings:—

Figure 1 is a view showing a reel in front elevation, fragmentarily, and embodying my improvements;

Figure 2 is a side view of Figure 1;

Figure 3 is a cross sectional view on the line 3—3 of Figure 1 and

Figure 4 is a detail perspective view of one slat and spoke connecting spring.

Like reference characters designate like or similar parts in the different views.

The reel shown has a suitable hub at 10 from opposite ends of which arms or spokes 11 radiate outwardly and in rigid relation thereto. As is obvious the spokes 11 may be of any desired number in order to mount cross slats 12, of any desired number, in parallel relation to the hub 10. Hub 10 is mounted on a shaft 10ª.

In existing structures, the slats 12 are rigidly connected to the spokes or the equivalent and as a result, considerable breakage of the slats and spokes is experienced because neither the slats nor spokes can yield to an obstruction or resistance if encountered. In accordance with the present invention, said slats 12 are yieldably and resiliently connected to the spokes 11. To this end, springs 13 are employed which are preferably made of metallic wire formed into one or more coils at 14 and with its opposite ends forming attaching arms 15 and 16 of unequal length, and the latter being the longer. Each arm 15 terminates in a loop 17 through which bolts 18 carried by the spokes 11 pass in order to rigidly connect the springs to such spokes. Similarly, each arm 16 terminates in a loop at 19 to permit passage of bolts 20 therethrough and which are adjustably mounted in elongated slots 21 adjacent each end of each slat 12. Bolts 18 and 20 may be of usual construction so that their nuts may be readily turned to fasten and loosen them.

The terminals for the loops 17 and 19 extend in opposite directions longitudinally of the reel and lie between the planes of the sides of the coils to insure maximum stability and connection of the springs 13, slats 12 and spokes 11.

Each spring 13 is tensioned so as to normally hold the slats in the position shown in the drawings and offer resistance to ordinary pressure or strain. However upon undue pressure or strain being exerted on the cross slats, as by means of obstructions or an excess of material in its path, the springs 13 will yield so as to prevent breakage, which would occur if the slats 12 were rigidly connected to spokes 11. After relief of an unusual condition, the springs 13 will restore the cross slats to normal position.

Slats 12 may be made of any suitable material but usually are of wood. As these slats frequently break at their ends, due to encountering obstructions thereat, the same are slightly shorter than usual and at each end have leaves or plates 22, of spring or resilient material projecting beyond the same. These leaves or plates 22 are usually of metal and fastened to the slats in any suitable manner as for instance detachably and by means of bolts 23. Thus the leaves 22 form the extremities of the slats and if they encounter obstructions or resistance will yield rather than break.

Changes in the details may be resorted to provided they fall within the spirit and scope of the invention.

I claim as my invention:—

5. In a reel, a slat, a spring having spaced arms extending in the same general direction, one of said arms being fastened to the reel proper and the other arm being fastened to the slat to off-set the latter with respect to the reel proper.

In testimony whereof I affix my signature in presence of two witnesses.

ANTON M. LIODAL.

Witnesses:
 GILMEN MALTAND,
 J. WULFSBERG.